United States Patent
Koo (10) Patent No.: US 7,286,541 B2
(45) Date of Patent: Oct. 23, 2007

(54) WIRELESS COMMUNICATION APPARATUS CAPABLE OF IMPROVING CONNECTION RATE

(75) Inventor: Chan-Kyu Koo, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 912 days.

(21) Appl. No.: 10/322,358

(22) Filed: Dec. 18, 2002

(65) Prior Publication Data

US 2003/0139191 A1 Jul. 24, 2003

(30) Foreign Application Priority Data

Dec. 18, 2001 (KR) ............... 10-2001-0080518

(51) Int. Cl.
*H04L 12/28* (2006.01)
*H04L 1/18* (2006.01)

(52) U.S. Cl. .................. 370/394; 714/748
(58) Field of Classification Search ............ None
See application file for complete search history.

(56) References Cited

U.S. PATENT DOCUMENTS

| | | | | |
|---|---|---|---|---|
| 6,272,117 | B1* | 8/2001 | Choi et al. ............. | 370/330 |
| 6,611,495 | B1* | 8/2003 | Meyer et al. ............. | 370/230.1 |
| 6,721,338 | B1* | 4/2004 | Sato ............. | 370/508 |
| 7,024,216 | B2* | 4/2006 | Vukovic et al. ............. | 455/509 |
| 7,218,680 | B1* | 5/2007 | Nafie et al. ............. | 375/285 |
| 2002/0054570 | A1* | 5/2002 | Takeda ............. | 370/252 |
| 2004/0196784 | A1* | 10/2004 | Larsson et al. ............. | 370/228 |
| 2004/0243684 | A1* | 12/2004 | Ha et al. ............. | 709/208 |
| 2005/0094647 | A1* | 5/2005 | Hata et al. ............. | 370/395.52 |
| 2006/0056356 | A1* | 3/2006 | Arvelo ............. | 370/332 |
| 2006/0211372 | A1* | 9/2006 | Shellhammer et al. ..... | 455/41.2 |
| 2006/0280143 | A1* | 12/2006 | Dabak et al. ............. | 370/329 |

FOREIGN PATENT DOCUMENTS

| | | |
|---|---|---|
| JP | 6-282502 A | 10/1994 |
| JP | 2000-115258 A | 4/2000 |
| JP | 2001-500714 A | 1/2001 |
| JP | 2001-237858 A | 8/2001 |
| JP | 2001-285304 A | 10/2001 |
| WO | WO 01/37507 A2 | 5/2001 |
| WO | WO 01/86434 A2 | 11/2001 |

* cited by examiner

*Primary Examiner*—Andrew C. Lee
(74) *Attorney, Agent, or Firm*—Sughrue Mion Pllc.

(57) ABSTRACT

A wireless communication apparatus and a wireless communication method capable of improving a connection rate. The wireless communication apparatus has: a transceiver for transceiving data with an external device; a response packet generator for generating a response packet for informing of a successful reception of a packet transmitted by the external device; and a control unit for transmitting the generated response packet to the external device through the transceiver when the packet is received, and re-transmitting the response packet after a predetermined time when it is judged that an error occurred in the transmitted response packet. Accordingly, as the wireless communication apparatus can increase the chance for packet transmission while trying to connect with an external device, the rate of re-trying from initial set-up due to a failure of connection with the external device will be reduced.

15 Claims, 9 Drawing Sheets

WIRELESS COMMUNICATION APPARATUS CAPABLE OF IMPROVING CONNECTION RATE

BACKGROUND OF THE INVENTION

1. Field of the Invention

The present invention relates to a wireless communication apparatus and a communication method using the same, and more particularly, to a wireless communication apparatus and a communication method capable of reducing the error rate of a connection conversion by improving communication flow during a conversion into a connection mode. The present application is based on Korean Patent Application No. 2001-80518, filed Dec. 18, 2001, which is incorporated herein by reference.

2. Description of the Related Art

Blue tooth is a wireless data communication technique employed in a range of fields in electrical communication, networking, computing, and consumer goods. Blue tooth can replace several cables required for connecting devices separated by a short distance. For example, when Blue tooth is realized in a mobile phone and a laptop computer, the devices can communicate with each other without using a cable. A printer, a PDA (personal digital assistance), a desktop computer, a facsimile, a keyboard, a joystick, and virtually all digital devices can be used in the Blue tooth system.

Generally, the fastest data transmission speed of Blue tooth is 1 Mbps and the maximum range of data transmission of Blue tooth is 10 m. 1 Mbps is an available transmission speed using a frequency within a range of the ISM (industrial scientific medical) frequency band of 2.4 GHz, which a user can use without permission and with low cost. Moreover, the transmission range of 10 m is great enough for the user to transmit data between a device and a PC in an office.

Furthermore, as Blue tooth is designed to be operated in a radio frequency band having a lot of noise, the data can be stably transmitted in a wireless frequency having much noise by using a frequency hopping method of 1600 times per second. The frequency hopping method is also called an FHSS (frequency hopping spread spectrum) method. In the FHSS method, a given frequency band is divided into many hopping channels, and is allocated to different hopping channels according to an order decided in advance when a signal (medium frequency) firstly modulated at a sending terminal is converted into an RF frequency band 2.4 GHz. Since the channel to which the signal is allocated is changed at a high speed, multi-channel interference and narrow band impulsive noise can be reduced. A receiving terminal restores an original signal by connecting the received signals after being allocated to several hopping channels in the same order as that of the sending terminal. 79 hopping channels are used for IEEE 802.11, and each hopping channel is disposed at an interval of 1 MHz. When the signal is allocated by hopping several channels, there should be at least a 6 MHz interval to avoid mutual interference between two temporally consecutive hopping channels, and the speed for changing the hopping channel (hopping rate) is more than 2.5 times per second.

Figure 1:
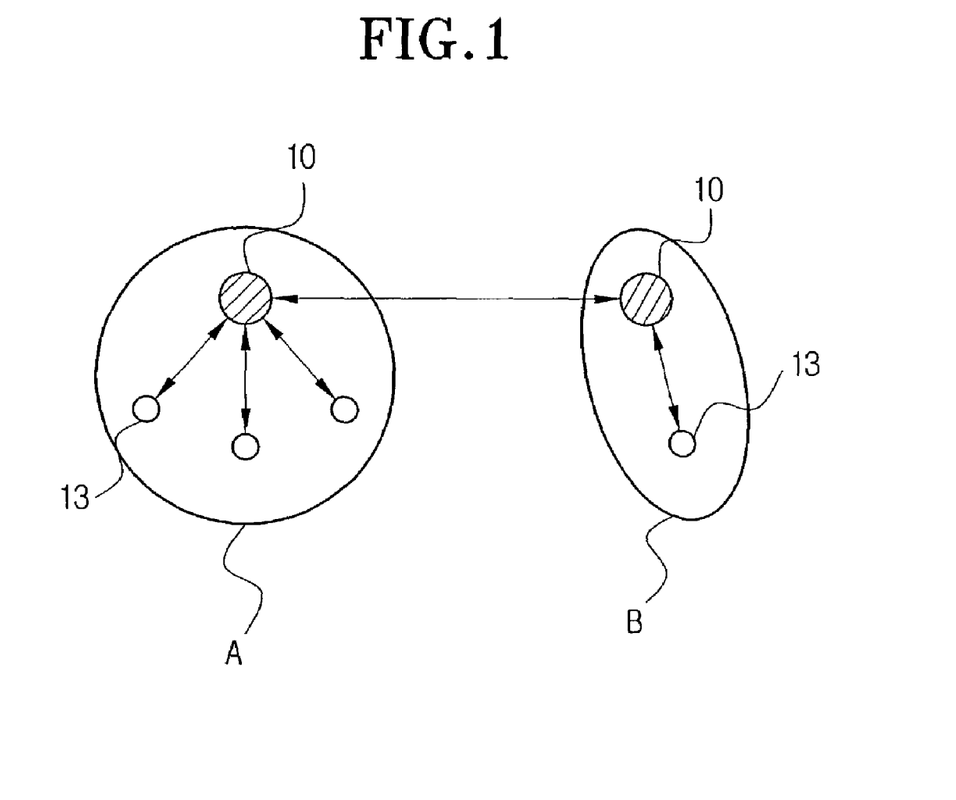
FIG. 1 is a view showing a scatternet of a Blue tooth system.

Moreover, the Blue tooth system supports a one-to-multiple connection as well as a one-to-one connection. As shown in FIG. 1, in the Blue tooth system, a plurality of piconets can be constructed and connected, respective piconets being divided by different frequency hopping orders. The term "piconet" refers to a Blue tooth unit formed by connecting one or more slaves to one master device. A piconet can have one master and a maximum of seven slaves. The master device decides the overall characteristics with respect to the channel in the piconet. Blue tooth device address (BD_ADDR) decides a frequency hopping sequence and a channel access code. In other words, a clock of the master decides a phase of the hopping sequence and sets up timing. Moreover, the master controls the traffic on the channels. Any digital device can be a master, and once the piconet is configured, a master and a slave can change their roles.

The master and the slave basically perform bi-directional communication by a time division duplex method having a hopping slot of 625 μs (¹⁄₁₆₀₀ second). A plurality of piconets connected with each other is called a scatternet.

Figure 2:
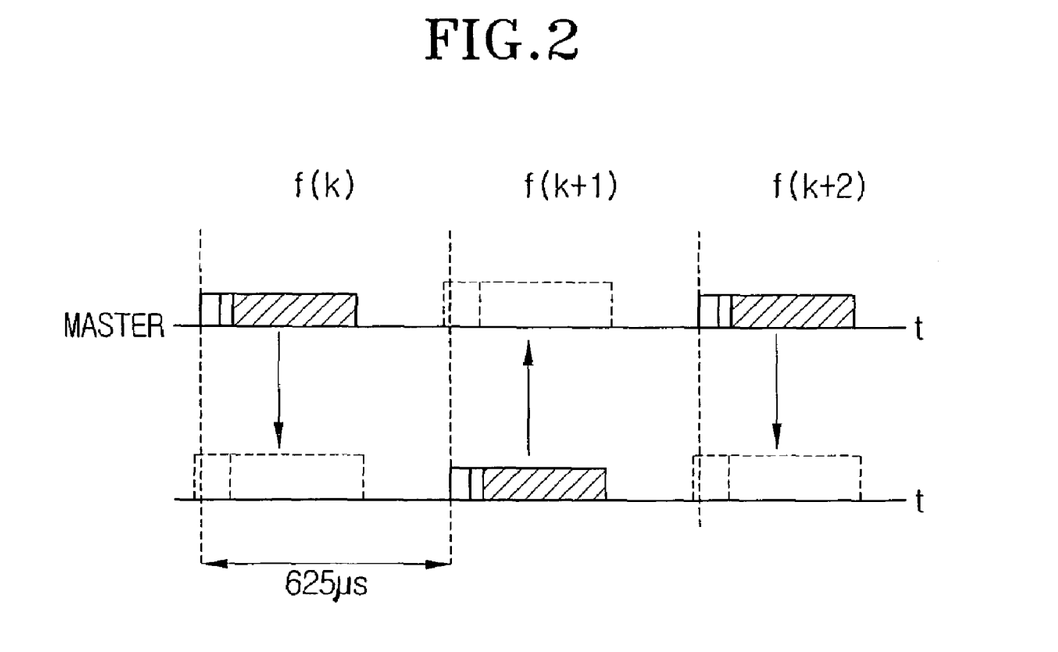
FIG. 2 is a view showing communication by TDD between a master and a slave.

FIG. 2 is a view showing communication by TDD between the master and the slave. Referring to FIG. 2, the length of each of the channels allocated to the time slot is 625 μs. The number of the time slot is decided in accordance with the Blue tooth clock of the piconet master. In addition, the master and the slave can selectively transmit a packet by the time slot. In other words, the master transmits the packet to time slots marked as even numbers, and the slave transmits the packet to time slots marked as odd numbers. Furthermore, the packet transmitted by the master and the slave should be realized within five time slots. Packet means a unit of data transmitted on the piconet channel.

In a Blue tooth connection state, the master can operate the slave in a hold mode, a sniff mode, or a park mode. In the hold mode, the slave connected with the master goes into a sleep state, while keeping an AM_ADDR (active member address). Additionally, in the sniff mode, a listening period is lengthened between the master and the slave that is connected with the master, while keeping an AM_ADDR. Moreover, in the park mode, the slave connected with the master enters into the sleep state after releasing the AM_ADDR. And before the slave moves to the park mode, the slave is allocated either a PM_ADDR (parked member address) or an AR_ADDR (access request address).

AM_ADDR is expressed as a member address, and recognizes active members in the piconet. In other words, when more than two slaves are connected with one master in the piconet, the master allocates a temporary three bit address to be used when the slaves are activated to recognize each slave. Therefore, the packets exchanged between the master and the slaves all carry AM_ADDR. In other words, an AM_ADDR of the slave is used not only for the packet transmission from the master to the slave but also for the packet transmission from the slave to the master. When the slave is not connected with the master or the slave is in the park mode, the allocated AM_ADDR is withdrawn. When the slave is connected with the master again, a new AM_ADDR should be allocated. The piconet should be limited to one master and seven slaves because the address allocated by a master to activate slaves is defined as three bits in the Blue tooth standard. In other words, address "000" among maximum eight addresses is reserved for broadcasting from a master to the slaves, and rest of the addresses from "001" to "111" are available.

Inquiry and paging processes are used to connect a new slave with the master. The inquiry process allows the apparatuses in the Blue tooth system to ascertain the address and clock of each of the apparatuses. The paging process is periodically performed by the master, and wakes up the slave. The response of the slave with respect to the paging process by the master is shown in FIGS. 3 and 4.

Figure 3:
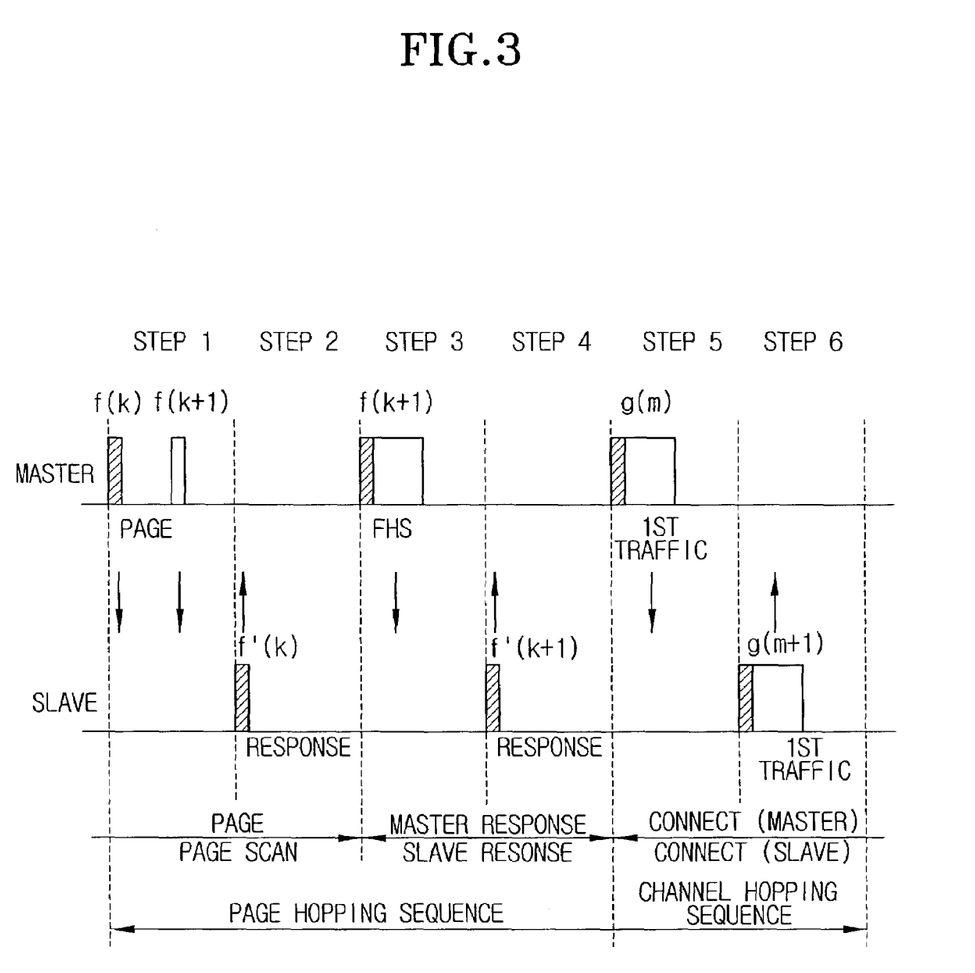
FIG. 3 is a view showing initial connection when a slave responds to a first paging message of a master.

FIG. 3 is a view showing an initial connection when the slave responses a first paging message of the master. FIG. 4 is a view showing an initial connection when the slave responses a second paging message of the master.

When the paging message transmitted by the master is successfully transmitted, the hopping frequency number of the master and the slave is synchronized. The master and the slave maintain the connection state and enter into a response routine to communicate information. An important aspect of the piconet connection state is that the master and the slave use the same channel access code and the same channel hopping sequence, and the clocks of the master and the slave are synchronized. The channel access code and the channel hopping sequence are obtained from BD_ADDR of the master, and the timing is established by the clock of the master. To temporarily synchronize the clock of the slave to the clock of the master, offset is added to the native clock of the slave. When the connection is started, a master parameter should be transmitted from the master to the slave.

Figure 4:
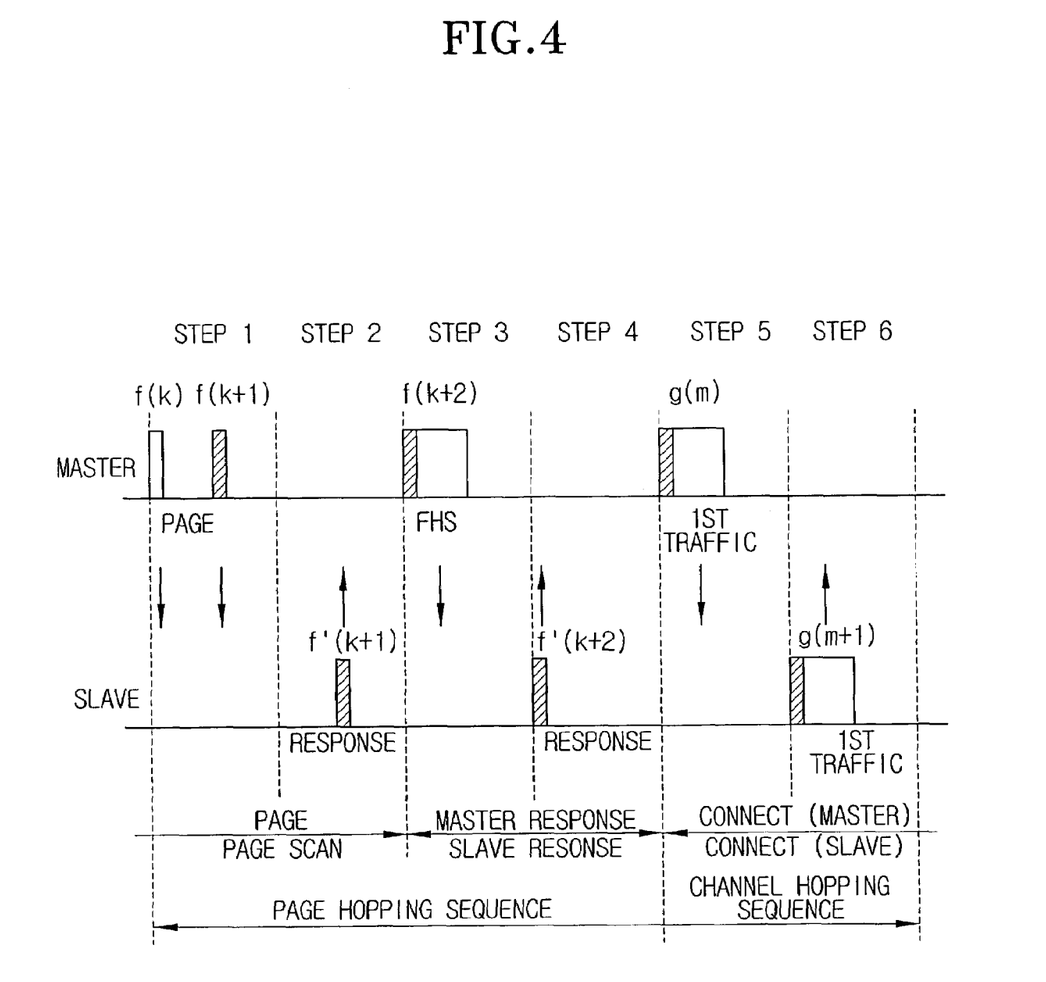
FIG. 4 is a view showing initial connection when a slave responds to a second paging message of a master.

Referring to FIGS. 3 and 4, frequency f(k) and f(k+1) are frequencies of a hopping sequence of a page decided by BD_ADDR of the slave. Frequencies f(k) and f(k+1) correspond to a page response frequency from the slave to the master. Frequency g(m) is included in the channel hopping sequence.

Table 1 shows an initial message communicated between the master and the salve.

| Step | Message | Direction | Hopping sequence | Access code and clock |
|---|---|---|---|---|
| 1 | slave ID | master to slave | page | slave |
| 2 | slave ID | slave to master | page response | slave |
| 3 | FHS | master to slave | page | slave |
| 4 | slave ID | slave to master | page response | slave |
| 5 | first packet master | master to slave | channel | master |
| 6 | first packet slave | slave to master | channel | master |

In step 1, the master is in the paging state, and the slave is in the paging scan state. When the slave enters into the paging scan state, the slave selects a scan frequency corresponding to the page hopping sequence of the master. In this step, it is assumed that the page message (device access code of slave) transmitted by the master is received by the slave.

When the device access code is recognized, the slave transmits the response message in step 2. The response message transmitted by the slave is composed only of the device access code of the slave. The slave transmits the response message at 625 μs from the start of the received page message (ID packet of slave), and the hopping frequency of the response message coincides with the hopping frequency of the received page message. While the initial message is being communicated, the slave uses the page response hopping sequence to return information to the master. After transmitting the response message, a receiver of the slave waits for a FHS (frequency hopping synchronization) packet by being activated at 312.5 μs after the response message is started (step 3). As shown in FIG. 4, the FHS packet might be able to be transmitted 312.5 μs after the page message is transmitted when the slave responds to the second paging message of the master. In other words, in this case, the interval of 625 μs like in RX/TX timing is not applied.

When the FHS packet is transmitted to the slave in the slave response state, the slave returns a response configured only with the device access code of the slave to the master to inform of receipt of the FHS packet by using the page response hopping sequence (step 4). The transmission of the response packet is based on the FHS packet. Moreover, the slave alters the access code and the clock to the channel of the master transmitted from the FHS packet. In other words, in step 5, the slave enters into the connection state, and from that time, the slave uses the clock and BD_ADDR of the master to decide the channel hopping sequence and the channel access code. Connection mode is started by a POLL packet transmitted by the master. The POLL packet and the NULL packet have the same structure. However, while a NULL packet does not need to be responded to, a POLL packet requires a response from a receiving terminal indicating whether the receiving terminal has data to send. In addition, a POLL packet does not affect a response controller with ARQ (automatic repeat request) and SEQN (sequential numbering scheme) or re-transmission control method. A representative usage of a POLL packet is to examine the existence of the slave by the master in the piconet. When there is a slave, it responds to the master.

In step 6, the slave provides responses corresponding to the type of packet. After a FHS packet is received, when a POLL packet is not received by the slave during a new allocated connection number or the response packet is not received by the master, the master and the slave return to a paging and a paging scan state.

Figure 5:
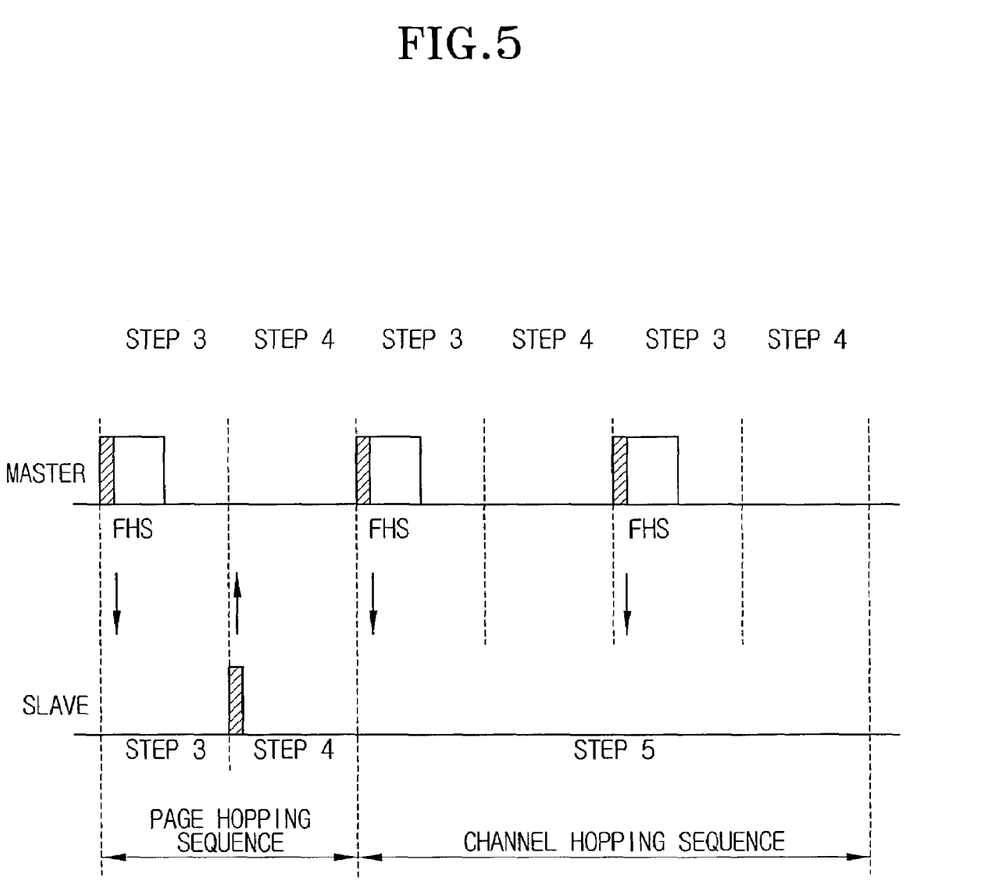
FIG. 5 is a view showing an error generated in connection set-up of a master and a slave.

As described so far, for a Blue tooth system to establish a connection state, a page and a page scanning process should be successful in a setting-up step so that the slave can receive the clock value of the master. However, when the master cannot receive the ID packet of the slave due to, for example, excessive distance, an obstacle, or a defective RF module, the master consecutively transmits a FHS packet for a predetermined number of times as shown in FIG. 5. Yet, the slave has already entered into the channel hopping sequence state after receiving the FHS packet and sending an ID packet. Thus, the slave awaits receipt of the POLL packet by the channel hopping sequence. Therefore, the connection of the master and the slave cannot be further processed. After a predetermined time is passed, the connection set-up process ends in failure. Accordingly, the master and the slave should start from step 1 again, thereby causing more consumption of electrical power and lowering the connection rate.

SUMMARY OF THE INVENTION

The present invention has been made to overcome the above-mentioned problems. Thus, the object of the present invention is to provide a wireless communication apparatus and a wireless communication method capable of reducing connection failure rate.

The above object is accomplished by providing a wireless communication apparatus comprising: a transceiver for transceiving data with an external device; a response packet generator for generating a response packet for informing of a successful reception of a packet transmitted by the external device; and a control unit for transmitting the generated response packet to the external device through the transceiver when the packet is received, and re-transmitting the response packet after a predetermined time when it is judged that an error occurred in the transmitted response packet.

The control unit judges that an error has occurred in the response packet when no packet corresponding to the response packet is received within a predetermined time. Moreover, the control unit judges that an error has occurred in the response packet when a received packet corresponding to the transmitted response packet is identical to a previously received packet.

The wireless communication apparatus further comprises a counter for counting the number of times the response packet is transmitted. The control unit initializes a connection with the external device when the number of times counted reaches a predetermined number.

The control unit commences to transceive the data when it is judged that the response packet is successfully transmitted. Here, the control unit judges that the response packet is successfully transmitted when a packet transmitted from the external device corresponding to the response packet is received within a predetermined time.

On the other hand, a wireless communication method according to the present invention comprises the steps of: generating a response packet for informing of a successful reception of a packet received from the external device; transmitting the generated response packet to the external device through a transceiver; judging if there is an error in receiving the response packet; and controlling the response packet to be re-transmitted after a predetermined time when it is judged that there is an error in receiving the response packet.

BRIEF DESCRIPTION OF THE DRAWINGS

The above-mentioned object and the feature of the present invention will be more apparent by describing the preferred embodiment of the present invention by referring to the appended drawings, in which.

DETAILED DESCRIPTION OF THE PREFERRED EMBODIMENT

From now on, the present invention will be described in greater detail by referring to the appended drawings.

Figure 6:
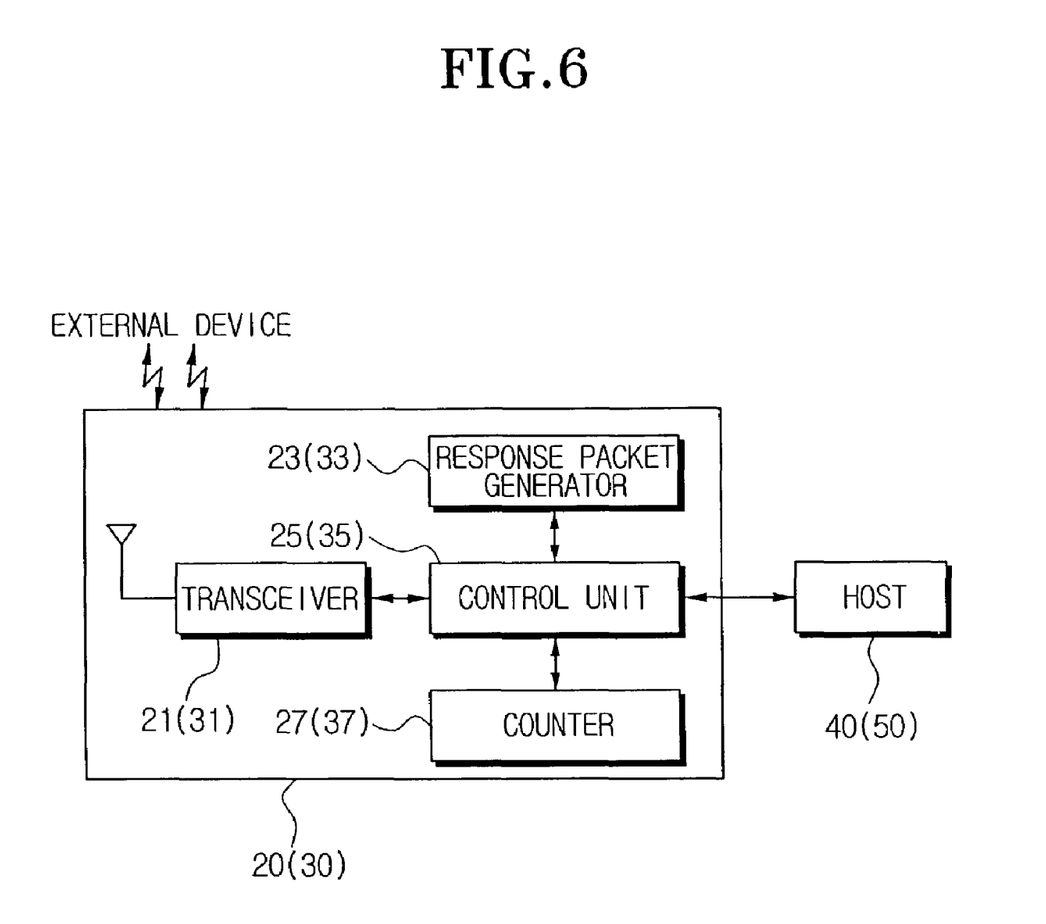
FIG. 6 is a block diagram schematically showing a wireless communication apparatus according to the present invention.

FIG. 6 is a view schematically showing a wireless communication apparatus according to the present invention. Referring to FIG. 6, the wireless communication apparatus has transceiver 21 (31), response packet generator 23 (33), control unit 25 (35), and counter 27 (37). The control unit 25 (35) of the wireless communication apparatus 20 (30) is connected with host 40 (50). Here, the reference numerals 20, 21, 23, and 25 are given to elements of the wireless communication apparatus operated as a master 20, and the reference numerals 30, 31, 33, and 35 are given to the wireless communication apparatus operated as a slave 30. Each of the elements of the master 20 has the same function as the wireless communication apparatus 30 that is operated as a slave.

The transceiver 21 (31) processes an RF signal transmitted from the outside, and sends an object data packet to the outside. The response packet generator 23 (33) generates a response packet for informing of a successful reception of a packet transmitted by an external device. The control unit 25 (35) sends the response packet generated at the response packet generator 23 (33), to the external device through the transceiver 21 (31), when a predetermined packet is transmitted from the external device by the transceiver 21 (31). Furthermore, the control unit 25 (35) judges whether an error is generated with respect to the transmitted response packet. When it is judged that there is an error generated with respect to the transmitted response packet, the control unit 25 (35) re-send the transmitted response packet after a predetermined time. The counter 27 (37) counts the number of transmissions of the transmitted response packet.

Figure 7:
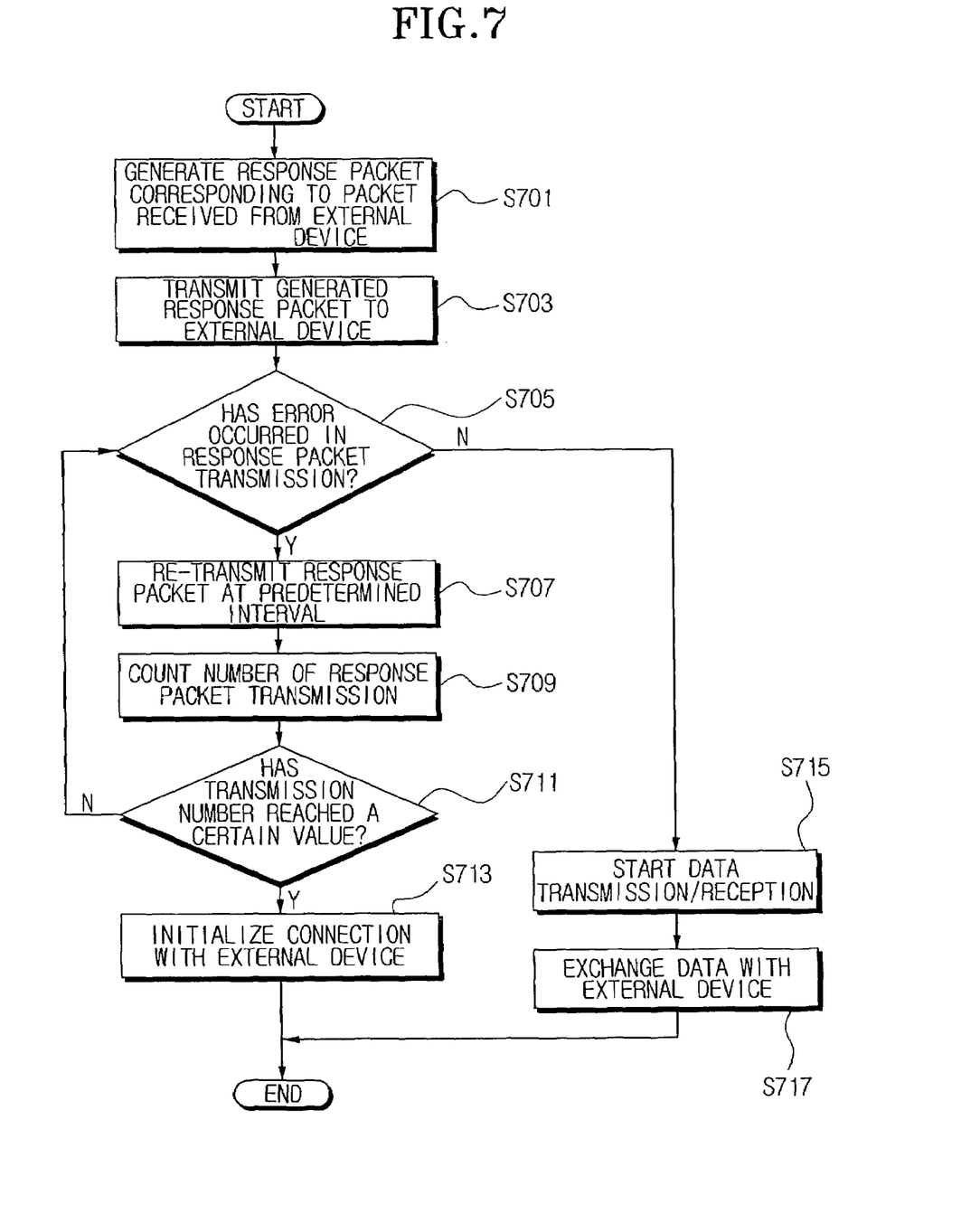
FIG. 7 is a flow chart showing a connection method of a wireless communication apparatus of FIG. 6 to external communication apparatus.

FIG. 7 is a flow chart showing a connection method of the wireless communication apparatus of FIG. 6 to the external communication apparatus. Referring to FIG. 7, the wireless communication apparatus 20 according to the present invention will be described in greater detail.

A device in a stand-by state has an inactive connection state and transmits no data. To attempt connection, the wireless communication apparatus 20 starts an inquiry process for finding all Bluetooth apparatuses in a region in which communication is possible. Generally, the wireless communication apparatus 20, which attempts to connect, becomes the master 20. In addition, the master 20 transmits a page message indicating an intended slave. In this case, the master 20 uses a device access code of the slave and timing information gained from the inquiry process.

When the slave 30 intended by the master 20 receives the page message, the response packet generator 33 of the slave 30 generates a response packet to the page massage transmitted from the master 20 (S 701). The response packet generated in the response packet generator 33 is composed only of the device access code of the slave 30. The response packet generated in the response packet generator 33 is controlled by the control unit 35 and transmitted to the transceiver 35. The transceiver 35 transmits the received response packet to the master 20 (S 703). The control unit 35 of the slave 30 judges whether the received response packet is successfully transmitted to the master (S 705). In this case, the control unit 35 of the slave 30 judges that there is an error in the transmitted response packet, when a packet corresponding to the transmitted response packet is not transmitted from the master 20 in a predetermined time. Moreover, the control unit 35 of the slave 30 judges that there is an error in the transmitted response packet, when the packet transmitted from the master 20 corresponding to the transmitted response packet is the same as a packet already transmitted.

The control unit 35 of the slave 30 controls the response packet generator 33 and the transceiver 31 so that a response packet which is the same as the transmitted response packet can be re-sent after a predetermined time, when it is judged that there is an error in the transmitted response packet (S 707). The counter 33 of the slave 30 counts the number of transmissions of the transmitted response packet (S 709). The control unit 35 of the slave 30 checks if the transmission number counted by the counter 33 reaches a predetermined value (S 711). When the control unit 35 of the slave 30 judges that the counted transmission number reaches the predetermined value, the control unit 35 initializes the connection with the master 20 (S 713). In other words, the connection process between the master 20 and the slave 30 is ended, and the master 20 starts again from the inquiry process.

When the master successfully receives the response packet of the page message from the slave 30, then the master 20 enters into a master response state. In other words, the response packet generator 23 of the master 20 generates a FHS packet as a response to the transmitted response packet (S 701). At this time, the FHS packet generated from the response packet generator 23 of the master 20 provides all the information required by the slave 30 including timing information, frequency hopping channel synchronization information and an accurate device access code.

The FHS packet generated at the response packet generator 23 of the master 20 is controlled by the control unit 25 of the master 20 and transmitted to the transceiver 25. The transceiver 25 of the master 20 sends the transmitted FHS packet to the slave (S 703). The control unit 25 of the master 20 judges whether the transmitted response packet is successfully transmitted to the slave 30 (S 705). In this case, the control unit 25 of the master 20 judges that there is an error in the transmitted FHS packet, when a response packet corresponding to the transmitted FHS packet is not transmitted from the slave in a predetermined time.

When it is judged that there is an error in the transmitted response packet, the control unit 25 of the master 20 controls the response packet generator 23 and the transceiver 21 so that an FHS packet which is the same as the transmitted FHS packet can be re-sent after a predetermined time (S 707). The counter 23 of the master 20 counts the number of times the FHS packet is transmitted (S 709). The control unit 25 of the master 20 checks whether the number of transmissions counted by the counter 23 reaches a predetermined value (S 711). When the control unit 25 of the master 20 judges that the counted transmission number reaches the predetermined value, the control unit 25 initializes a connection with the slave 30 (S 713). In other words, the connection process between the master 20 and the slave 30 is ended, and the inquiry process is started again.

Figure 8:
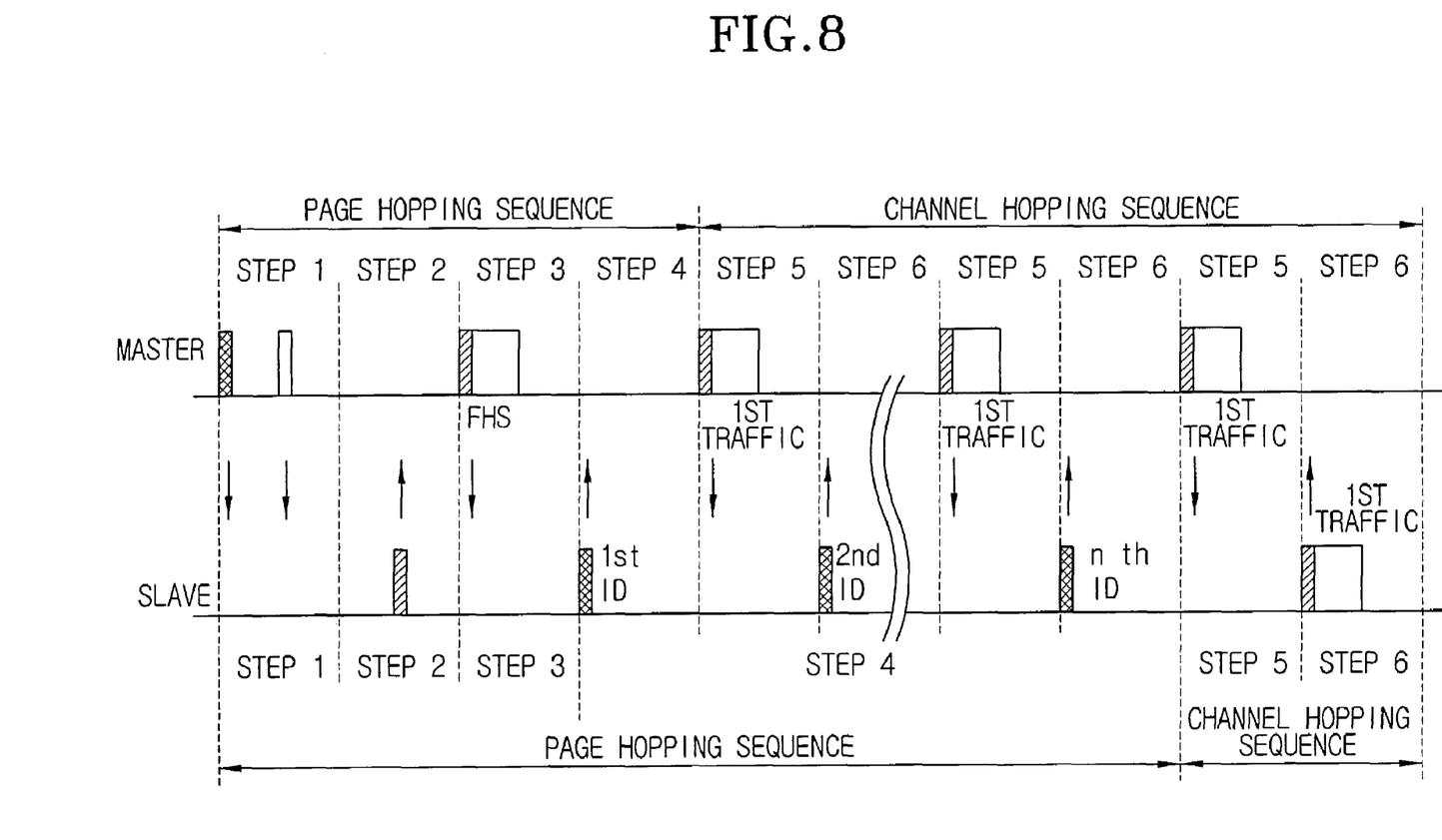
FIG. 8 is a view showing one example of communication by TDD by the apparatus of FIG. 6.
Figure 9:
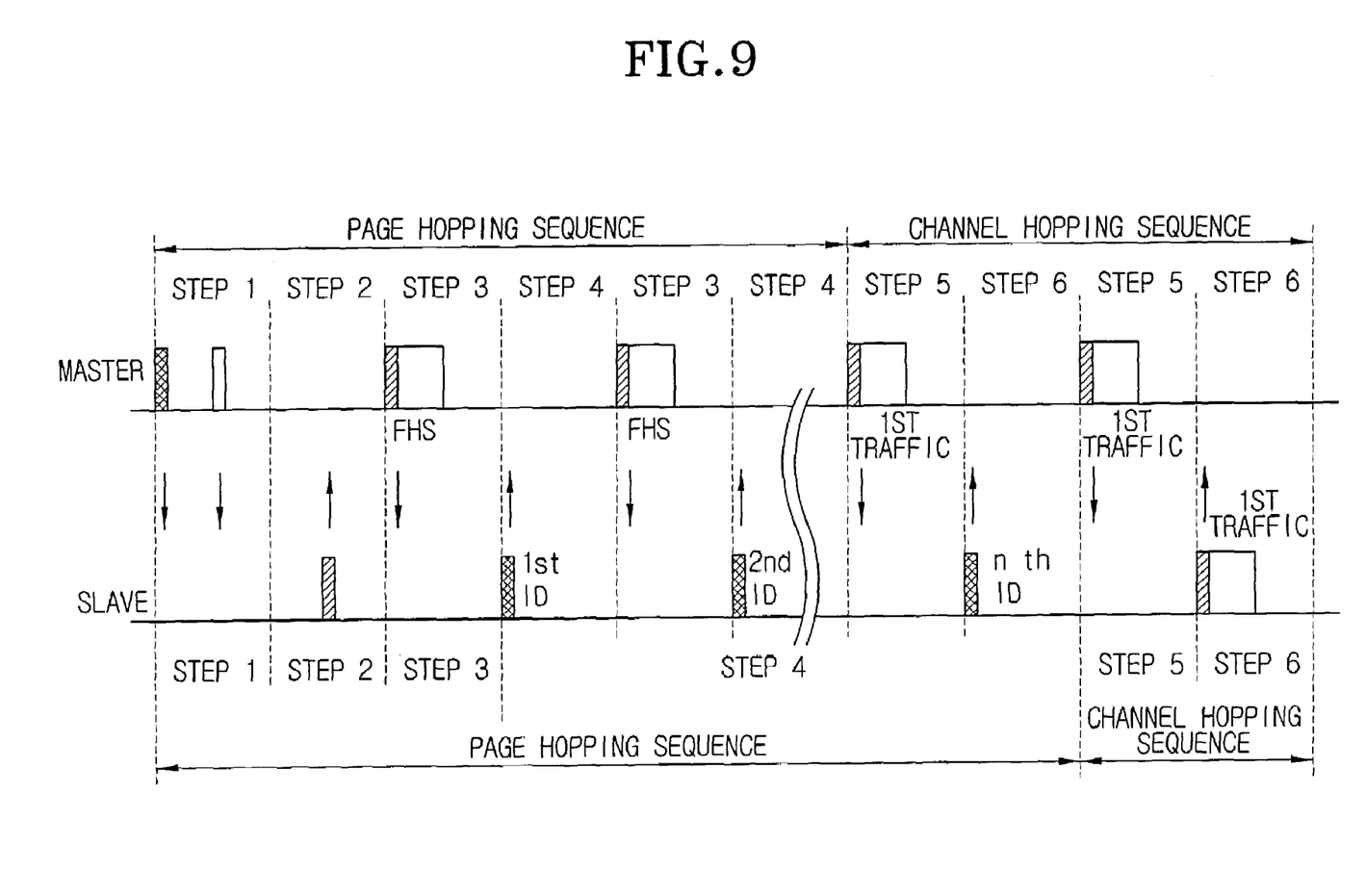
FIG. 9 is a view showing another example of communication by TDD by the apparatus of FIG. 6.

When the slave 30 successfully receives a FHS packet from the master 20, the response packet generator 33 of the slave 30 generates a response packet indicating receipt of the FHS packet transmitted from the master 20 (S 701). The response packet with respect to the FHS packet is transmitted to the master 20 (S 703), and the processes are shown in FIGS. 8 and 9 as steps 1 through 4. Here, a train of signals wherein the master sends the device access code of the slave 30 to connect with the slave 30 is a page hopping sequence. Additionally, page scan means that the slave 30 receives its device access code with respect to the page hopping sequence of the master 20 and transmits the device access code to indicate receipt of the device access code to the master 20. Furthermore, a train of signals of the device access code of the slave transmitted by the slave 30 is a page hopping sequence by the slave 30. The control unit 35 of the slave 30 judges whether the response packet of the FHS packet is successfully transmitted to the master 20 (S 705). The subsequent process is the same as described before. As the control unit 35 of the slave 30 judges that the transmitted response packet corresponding to the transmitted FHS packet is successfully received, the page message by the master 20 is allowed.

When the master 20 receives the response packet with respect to the FHS packet from the slave 30, the master 20 starts data transmission and transmits data traffic to the slave 30 (S 715). From this time, a channel for data transmission of the master 20 and the slave 30 is opened. The train of the data packet transmitted through the channel is the channel hopping sequence.

When the slave 30 successfully receives a first traffic transmitted from the master 20, the slave 30 transmits data traffic intended to be transmitted by the slave 30 to the master 20. Data transmission between the master 20 and the slave 30 is performed as described so far (S 717).

When the slave 30 cannot successfully receive the first traffic transmitted from the master 20, the control unit 35 of the slave 30 judges that there is no response from the master 20 in a predetermined time and also there is an error in the response packet transmitted by the slave 30. Therefore, the control unit 35 of the slave 30 controls the transceiver 31 and the response packet generator 33 so that a response packet which is the same as the response packet transmitted after the predetermined time can be transmitted (S 707). As the master 20 receives a response packet re-transmitted by the slave 30, the master 20 re-sends the first traffic to the slave 30. The above process is repeated until the slave 30 successfully receives the first traffic transmitted by the master 20 within a set-up range of the transmission numbers counted by the counters 27 and 37. The process is described in steps 5 and 6 in FIG. 8.

Furthermore, FIG. 9 shows a case that the control unit 35 of the slave 30 judges that there is an error in the response packet of the FHS packet and the first traffic. In FIG. 9, slave 30 re-sends the response packet if the slave 30 does not receive the FHS packet transmitted from the master 20. The master 20 re-sends the FHS packet in accordance with the response packet re-transmitted from the slave 30. After the re-transmission process of the FHS packet is repeated several times, the slave 30 successfully receives the FHS packet re-transmitted by the master 20. However, when it is judged that there is an error in the first traffic transmitted by the master 20, the same process is operated in this case.

Figure 10:
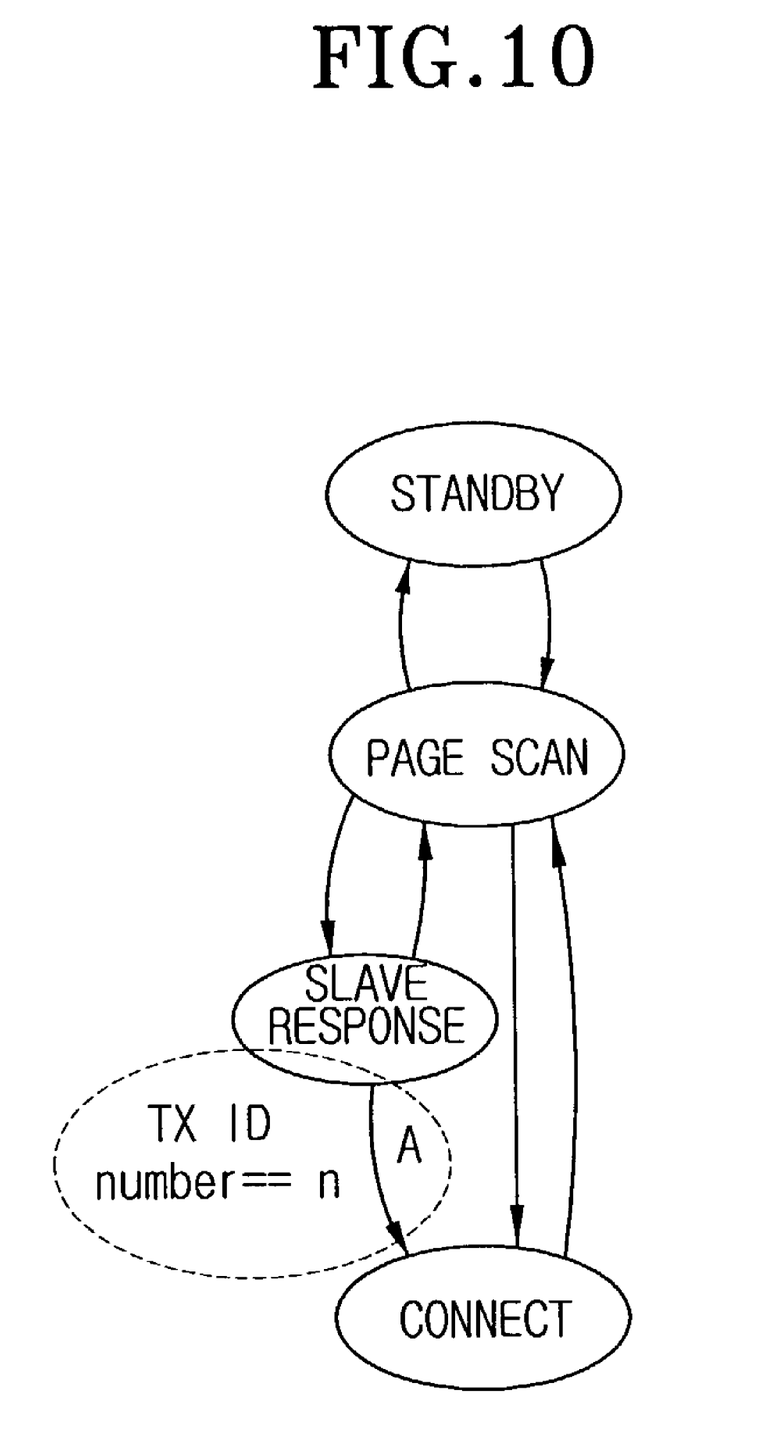
FIG. 10 is a view schematically showing connection process with an external apparatus by the apparatus of FIG. 6.

FIG. 10 is a view schematically showing a connection process with an external device. Referring to FIG. 10, in the stand-by state, that is in a state where the master 20 and the slave 30 are not connected, the page scan process of the slave 30 is operated by the inquiry process and the page process of the master 20. When the response packet of the slave 30 is transmitted to the master 20 through the page scan process of the slave 30, and the response packet of the slave 30 is successfully transmitted, the connection of the master 20 and the slave 30 is completed.

In the completed connection state, the master 20 and the slave 30 communicate the data. In this process, as the transmission of the response packet from the slave 3- to the master 20 can be repeated several times, the connection success rate of the master 20 and the slave 30 is increased.

According to the present invention, as the chances of successful packet transmission during connection of the wireless communication apparatus with the external device are increased, the wireless communication apparatus does not have to try again from the initial set-up due to the connection failure. Therefore, the connection success rate is increased, and consequently, electrical consumption caused by one or more re-tries from the initial set-up can be reduced.

So far, the preferred embodiment of the present invention has been illustrated and described. However, the present invention is not limited to the preferred embodiment described here, and someone skilled in the art can modify the present invention without departing from the spirit of present invention claimed in the claims section.

What is claimed is:

1. A wireless communication apparatus comprising:
a transceiver for transceiving data with an external device;
a response packet generator for generating a response packet for informing of a successful reception of a packet transmitted by the external device wherein the response packet is a control packet and wherein the packet is a data packet; and
a control unit for transmitting the generated response packet to the external device through the transceiver when the packet is received, and re-transmitting the response packet after a predetermined time when it is judged that an error has occurred in transmitting the generated response packet.

2. The wireless communication apparatus of claim 1, wherein the control unit judges that the error has occurred in transmitting the response packet when a packet corresponding to the response packet is not received within a predetermined time.

3. The wireless communication apparatus of claim 1, wherein the control unit judges that the error has occurred in transmitting the response packet when a received packet corresponding to the transmitted response packet is identical to a previously received packet.

4. The wireless communication apparatus of claim 1, wherein the response packet includes a device access code.

5. The wireless communication apparatus of claim 1, further comprising a counter for counting a number of times the response packet is transmitted, wherein the control unit initializes a connection with the external device when the number of times counted reaches a predetermined number.

6. The wireless communication apparatus of claim 1, wherein the control unit starts to transceive the data when it is judged that the response packet is successfully transmitted.

7. The wireless communication apparatus of claim 6, wherein the control unit judges that the response packet is successfully transmitted when a packet corresponding to the response packet is received from the external device within a predetermined time.

8. A wireless communication method comprising the steps of:
generating a response packet for informing of a successful reception of a packet received from an external device wherein the response packet is a control packet and wherein the packet is a data packet;
transmitting the generated response packet to the external device;
judging if an error has occurred in receiving the response packet; and
controlling the response packet to be re-transmitted after a predetermined time when it is judged that an error has occurred in receiving the response packet.

9. The wireless communication method of claim 8, wherein the judging step judges that the error has occurred in receiving the response packet when no packet corresponding to the response packet from the external device is received.

10. The wireless communication method of claim 8, wherein the judging step judges that the error has occurred in receiving the response packet when a received packet corresponding to the received response packet is identical to a previously received response packet.

11. The wireless communication method of claim 8, wherein the response packet includes a device access code.

12. The wireless communication method of claim 8, further comprising:
counting a number of times the response packet is received; and
initializing a connection with the external device when the number of times counted reaches a predetermined number.

13. The wireless communication method of claim 8, wherein, in the step of controlling, data transceiving is started when it is judged that the response packet is successfully transmitted.

14. The wireless communication method as claimed in claim 13, wherein the judging step judges that the response packet is successfully transmitted when a packet corresponding to the response packet is received from the external device.

15. A wireless communication apparatus comprising:
a transceiver for transceiving data with an external device;
a response packet generator for generating a response packet for informing of a successful reception of a packet transmitted by the external device;
a control unit for transmitting the generated response packet to the external device through the transceiver when the packet is received, and re-transmitting the response packet after a predetermined time when it is judged that an error has occurred in transmitting the generated response packet; and
a counter for counting a number of times the response packet is transmitted, wherein the control unit initializes a connection with the external device when the number of times counted reaches a predetermined number.

* * * * *